Figure 1:
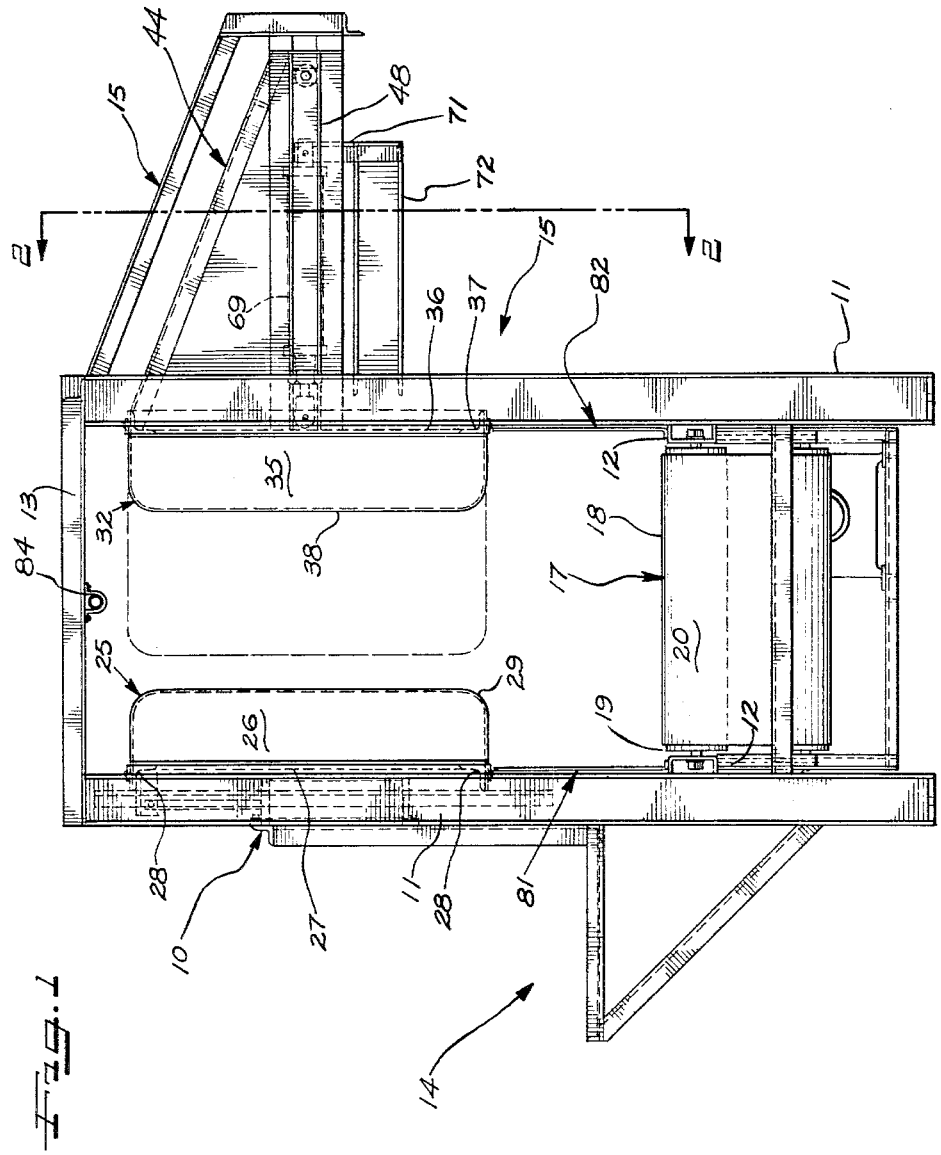

Jan. 18, 1966  J. E. SAUVAGE  3,229,324
APPARATUS FOR RESTRAINING ANIMALS
Original Filed July 20, 1962  5 Sheets-Sheet 1

INVENTOR.
JOHN E. SAUVAGE

Jan. 18, 1966 J. E. SAUVAGE 3,229,324
APPARATUS FOR RESTRAINING ANIMALS
Original Filed July 20, 1962 5 Sheets-Sheet 2

INVENTOR.
JOHN E. SAUVAGE
By Atty

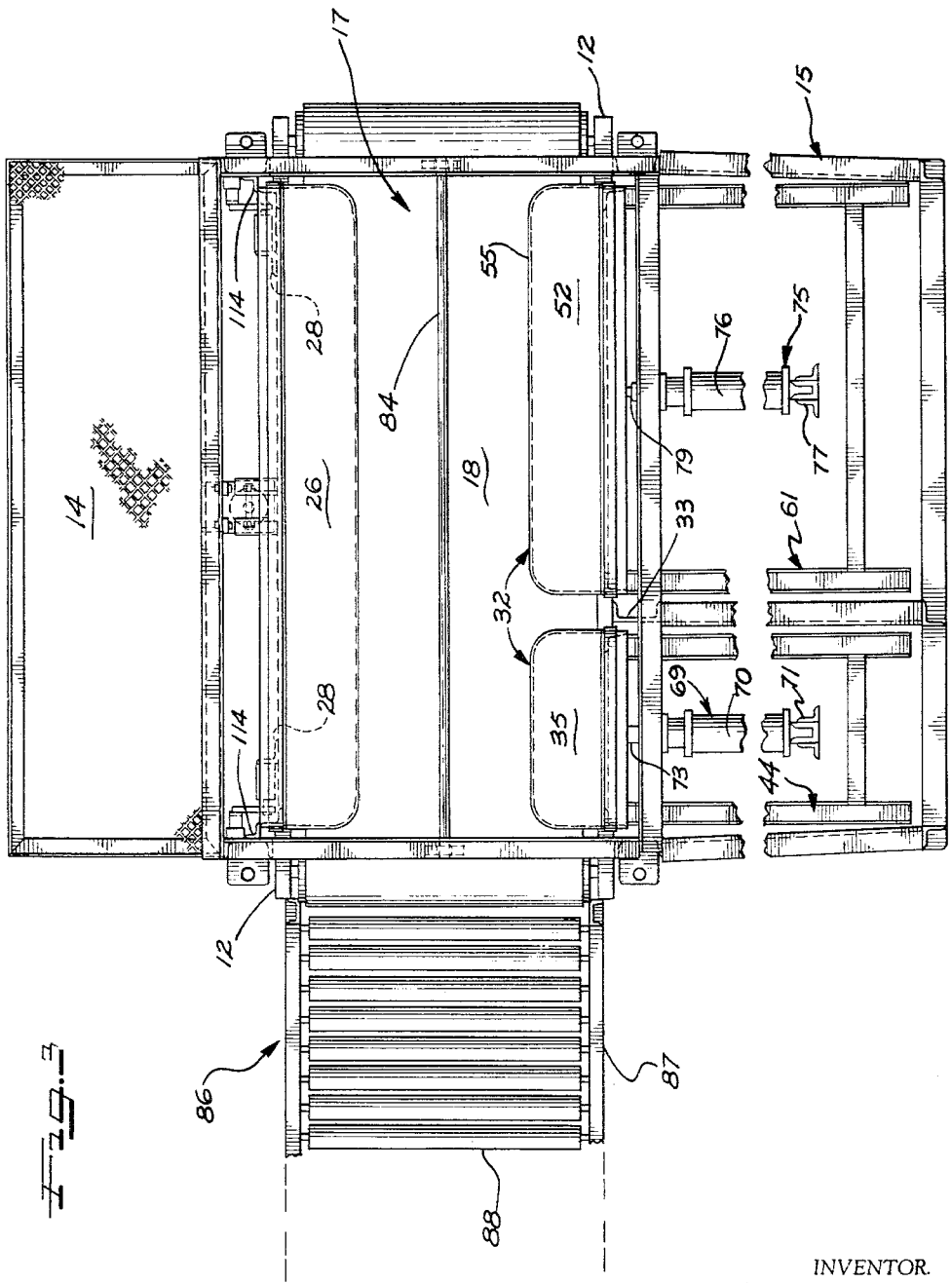

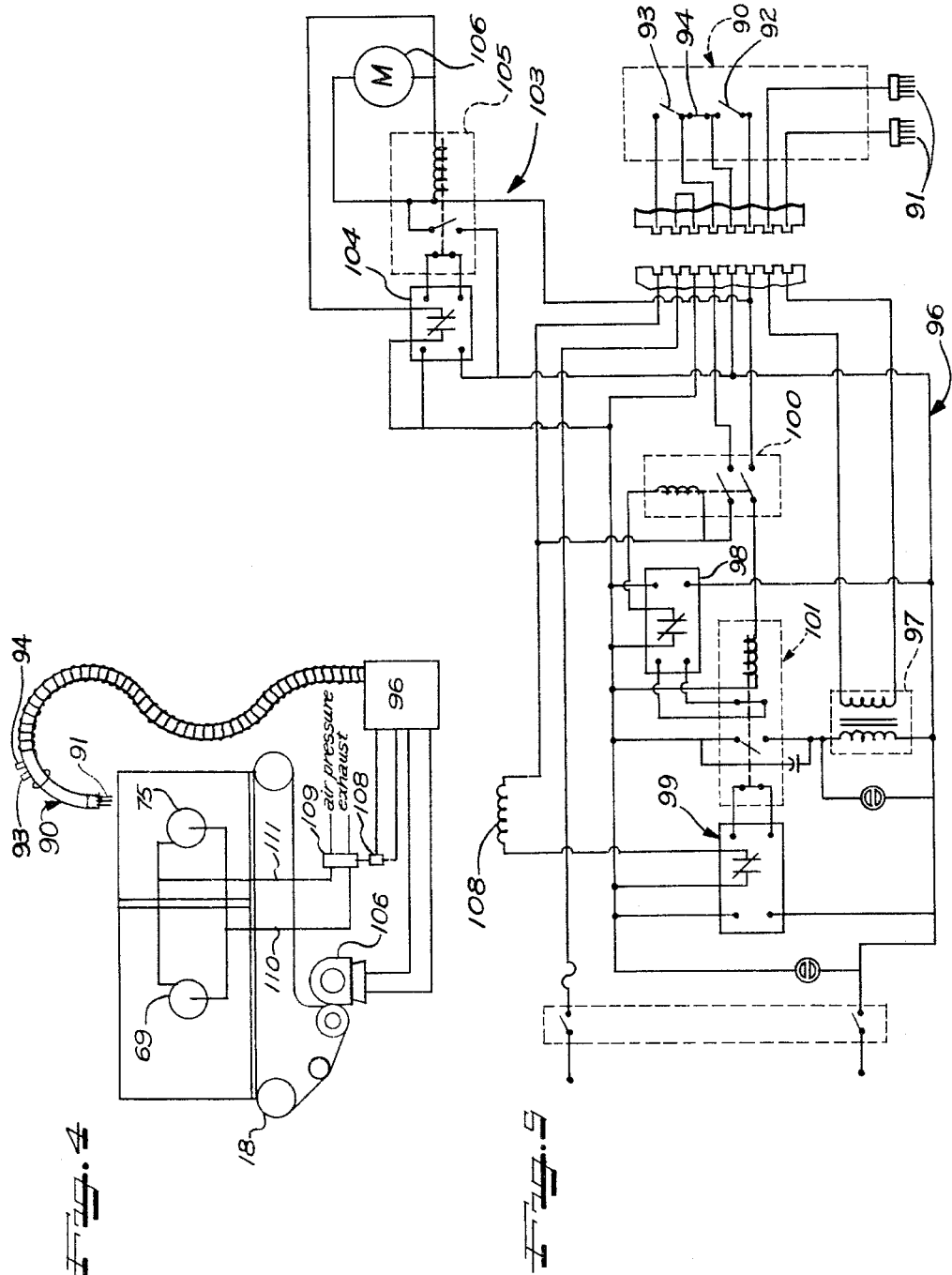

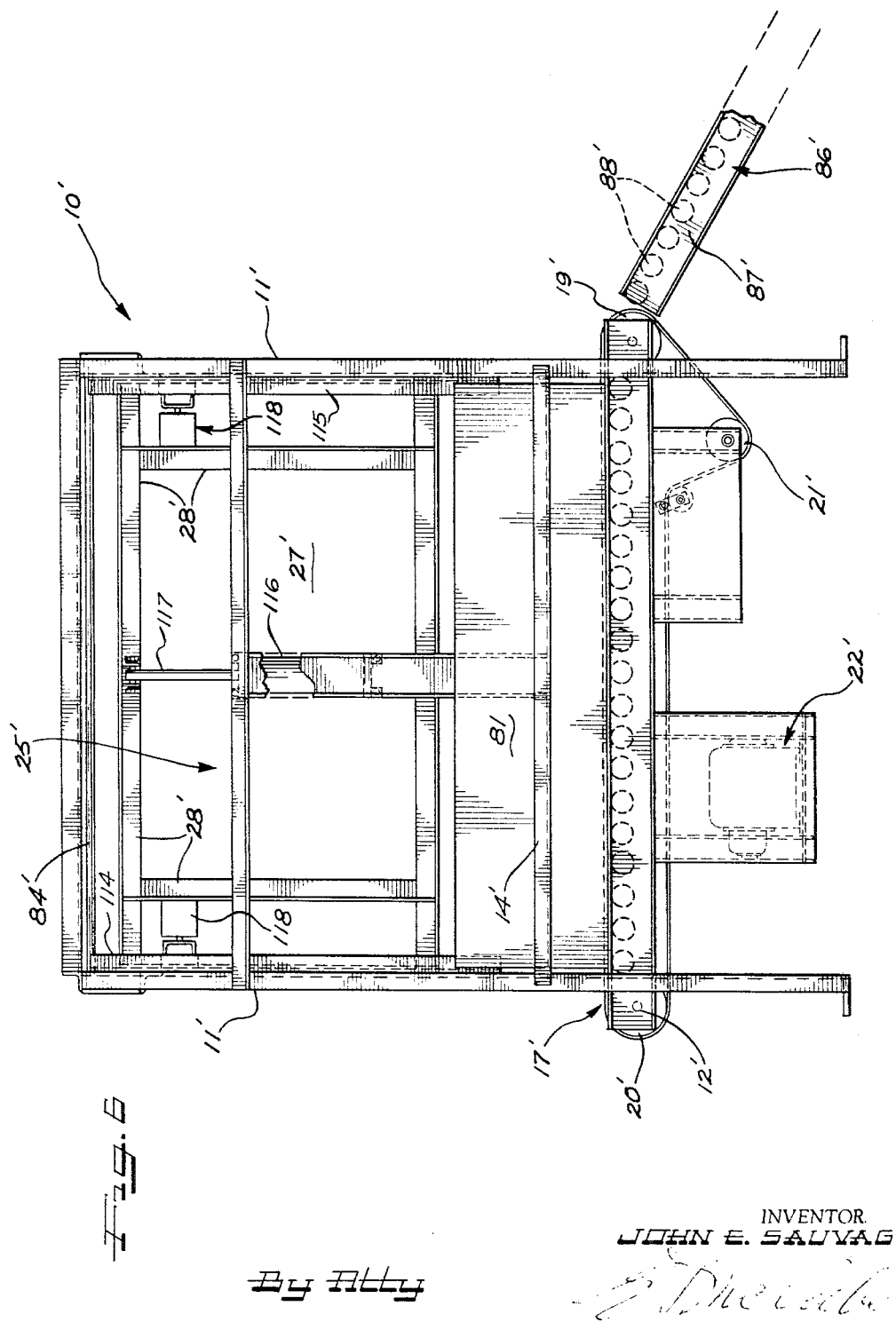

United States Patent Office
3,229,324
Patented Jan. 18, 1966

3,229,324
APPARATUS FOR RESTRAINING ANIMALS
John E. Sauvage, Chicago, Ill., assignor to Swift & Company, Chicago, Ill., a corporation of Illinois
Original application July 20, 1962, Ser. No. 211,306. Divided and this application Oct. 23, 1964, Ser. No. 406,140
3 Claims. (Cl. 17—1)

This application is a division of copending application S.N. 211,306 which was filed July 20, 1962.

This invention deals generally with apparatus for restraining animals. More specifically, this invention deals with an apparatus for restraining calves and sheep from movement while being stunned in a slaughtering operation.

Earlier equipment for restraining animals has generally involved a single cushion or restraining means positioned at each side of the animal wherein one or both of such means are moved inwardly to grip the animal between them. Certain of these apparatus have involved the automatic conveying of standing animal to a position between such restraining means. My earlier joint invention, described in co-pending application S.N. 833,289, filed August 12, 1959, now Patent No. 3,051,984, discloses such an apparatus wherein one of the restraining means is moved vertically at one side of a conveyor, and the other restraining means is pivoted inwardly and upwardly from the other side of the conveyor so as to support the restrained animal upon one side. That apparatus, while having some general application to all specie of animal, has proven to be particularly adapted to restrain hogs. The present invention is an improvement on my earlier invention insofar as the restraining of sheep and calves is concerned.

Also, certain earlier apparatus, which did not include a conveyor for handling the animals, involved the use of three separate pairs of animal engaging members operating to engage the body, neck, and head of an animal whereby the head could be mechanically twisted to break the animal's neck. That apparatus was devised principally for handling cattle. Due to the number of moving parts involved, such apparatus is relatively expensive; and it is also subject to malfunction for the same reason. Additionally it is somewhat awkward to operate and therefore justifiable only for large animals such as cattle, in that the position of the animal within the restraining apparatus is critical if all of the elements are to engage the proper portions of the animal.

The former type of apparatus, having only two opposed side cushions, while admirably suited for restraining hogs where the head of the animal is thick and is held normally at about the same level as the animal's body, has had serious drawback when used to restrain animals having head held above the body level or of a dimension substantially less than the body thickness. This is because such animals have been able to move their heads readily when their bodies have been engaged by such a restrainer. Since the object of restraining the animals to hold them immobile while applying a stunning force to their head, it may be seen that immobilization of the head is necessary.

Also, it has been found in apparatus employing a conveyor for moving the animals therein, that many animals balk and will not voluntarily step upon a moving conveyor. Thus difficulty has been experienced in advancing certain animals, particularly sheep and calves, to the restraining means in such apparatus.

Accordingly, it is a principal object of the present invention to provide an improved apparatus to obviate the aforementioned disadvantages of the prior art.

It is a further object of the present invention to provide an improved apparatus for restraining a sheep or calf whereby the head of the animal is held immobile separately from the body of the animal.

It is another object of the present invention to provide an improved apparatus for restraining sheep and calves wherein there is less tendency of the animals to hesitate when moving into a position where they may be restrained.

It is a still further object of this present invention to provide an improved apparatus for restraining sheep and calves wherein the head and body of such animal are effectively restrained by a minimum number of moving elements.

Basically the method of the present invention involves moving an animal under its own power to a location where it is restrained against a single fixed member by applying two separate forces against the head and body of the animal from a side opposite said member. The animal is then rendered unconscious while so restrained, and while it is being rendered unconscious the support beneath the animal is moved outwardly from that location so that when the forces are released the animal will fall and be conveyed away from the area at which it was restrained.

One form of apparatus for carrying out the method of this invention comprises an intermittently movable conveyor and a fixed restraining means located above one side of the conveyor at a given location. A pair of adjacent, separately movable restraining means are located above the opposite side of the conveyor at the same location and are independently movable across the conveyor toward the fixed restraining means by a pair of separate actuating means.

Figure 2:
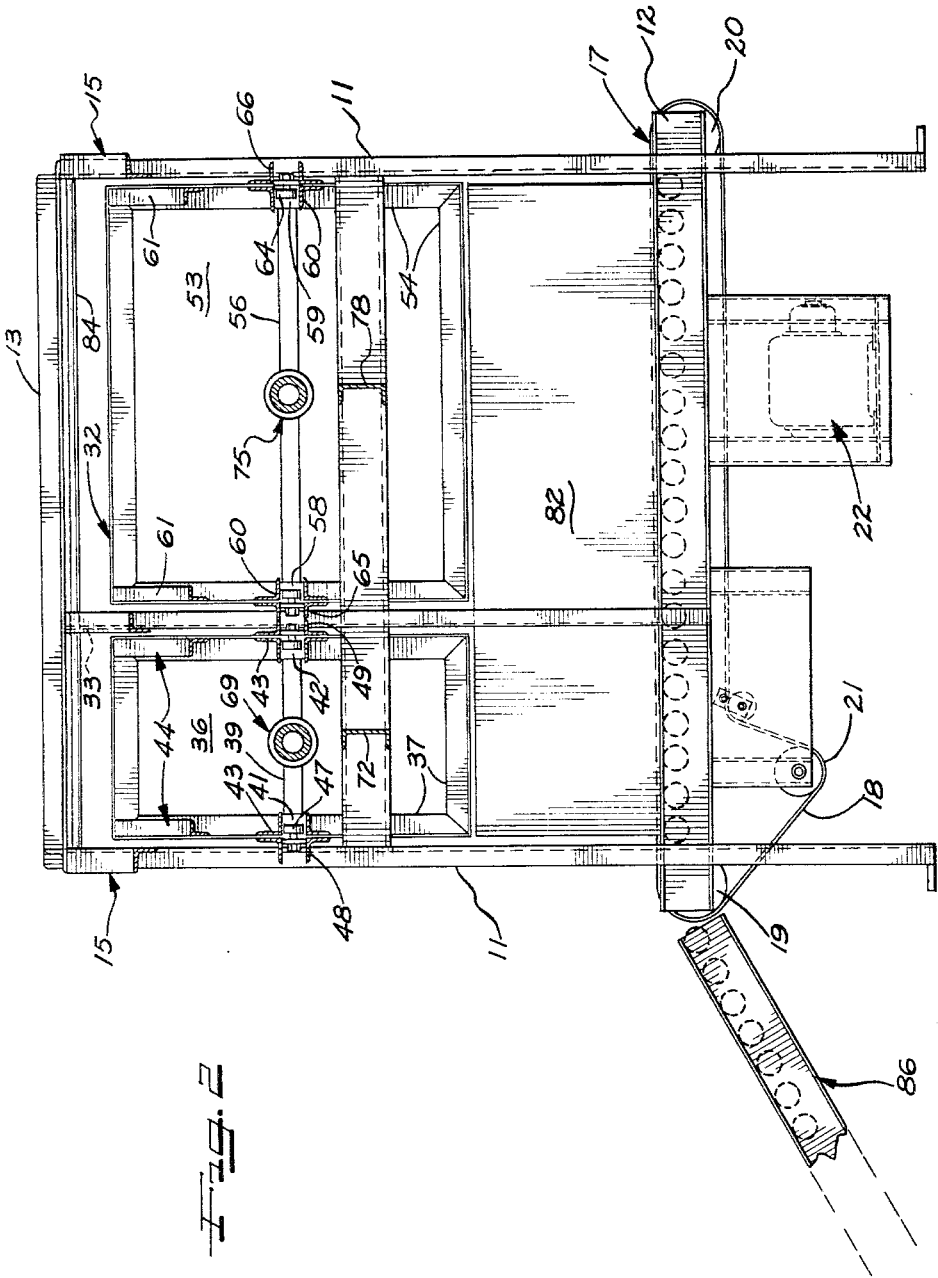

Further objects and advantages of the present invention will become apparent upon reading the following specification in conjunction with the drawings wherein:

FIGURE 1 is a front elevation view of the restraining apparatus with discharge ramp removed;
FIGURE 2 is a side elevation view of the apparatus partly in sections, taken at line 2—2 in FIGURE 1;
FIGURE 3 is a plan view of the apparatus;
FIGURE 4 is a schematic diagram showing the present restraining apparatus and the means to control its operation;
FIGURE 5 is a wiring diagram of the present apparatus and an electrical stunning instrument preferably used therewith; and
FIGURE 6 is a side elevation of a second embodiment of the restraining apparatus.

I have found that sheep and calves may be more readily restrained for stunning and subsequent slaughtering operations if they are caused to walk under their own power to the location at which they are to be restrained. According to my present invention such animals are urged to walk along a narrow path to a location defined by a relatively fixed and stationary restraining means at one side of the path. When an animal reaches that location it is restrained against the stationary restraining means by applying separate froces against the head portion of the animal and the hind portion of the animal from the opposite side of the path. These forces are applied across a sufficient distance to separately and fully press both the head and body of the animal against the stationary restraining means whereby the animal will be unable to move its head.

Thereafter the animal is rendered unconscious by applying a stunning force to its restrained head. This is preferably done with an electrical stunning instrument to apply an electrical shock to the animal's head for a time of a few seconds' duration. However, any form of stunning instrument such as a "knocking" apparatus may be used.

During the time that the animal is being stunned the path beneath the animal is commenced to be moved outwardly away from the restraining location, preferably in the direction opposite that from which the animal advances to the location. When the stunning is complete and the animal is unconscious the two separate restraining forces are simultaneously removed and the animal is dropped to lie upon the moving path, and is thus conveyed away from the restraining zone. The animal is thereafter, and preferably within a very short period of time, dispatched by sticking, that is severing a portion of its neck or veins, whereby it will bleed to expiration.

The preferred apparatus I have devised for carrying out this method may be seen in the drawings. The restraining apparatus is supported within a box-like frame generally 10 consisting of a plurality of upright members 11 suppporting a horizontal bed 12 and a plurality of horizontal top members 13. An operator's platform generally 14 is suspended outside of the frame generally 10 at one side and about 6" above the level of the horizontal bed 12; and a side frame generally 15 is suspended at the opposite side of the frame generally 10 at the upper portion thereof.

An animal runway generally 17 comprising, in part, an endless conveyor 18, trained about a pair of pulleys 19, 20 is supported upon the horizontal bed 12 of the frame 10. Pulleys 19 and 20 are journaled within the horizontal bed 12, and there-beneath are located a belt tightener roll 21 and an intermittently operable conveyor drive apparatus generally 22.

At one side of the runway 17 and spaced above the level of the endless conveyor 18 is a stationary restrainer means generally 25. The stationary restainer 25 comprises a cushion 26, of foam material or the like, mounted upon a rectangular plate 27 which is supported within the frame 10. Reinforcements 28 are provided on the back side of the plate 27; and the cushion is covered with a surface material 29 preferably of a roughened belting material.

At the side of the runway 17 opposite the stationary restrainer means 25, and at about the same level above the endless conveyor 18, are positioned a pair of movable restrainer means generally 32 (mainly cushions 35 and 52 subsequently described in detail). This pair of means is divided by an upright member 33 extending from the horizontal bed 12 to a top member 13 directly thereabove. The pair of movable restrainer means generally 32 may be of unequal dimensions as illustrated. The smaller movable restrainer comprises a first cushion 35 for the head of an animal, mounted upon a plate 36 having reinforcements 37 on its back side and a roughened belting surface material 38 stretched over the cushion. The reinforced side of plate 36 also supports a horizontal middle brace member 39. A pair of roller-ways 41, 42 extend outwardly from the plate 36 at each end of the middle brace member 39. Each roller-way 41, 42 is constructed of steel angle members 43 and is held perpendicular to the plate 36 by a subframe generally 44 which moves with the restraining means.

The roller-ways 41, 42 also ride upon a plurality of rollers 47 rotatably supported at the forward ends (in the direction of inward movement) of horizontal members 48, 49 of the side frame 15, so as to be reciprocable across the runway 17 toward the stationary restrainer means 25. Similar rollers are also mounted on the rear ends of the roller-ways 41, 42 and roll against the horizontal members 48, 49 to hold the subframe 44 level throughout its path.

The larger of the pair of movable restrainer means generally 32 is similarly constructed of a second cushion 52 mounted upon a horizontally movable plate 53. The plate 53 includes reinforcing members 54 on its back side and a roughened surface material 55 is stretched across the cushion 52. The plate 53 also supports a middle horizontal brace member 56 from the ends of which a pair of roller-ways 58, 59 extend perpendicularly. The roller-ways 58, 59 are each comprised of a pair of angle members 60 supported by a subframe generally 61 attached to the plate 53 and movable therewith. The latter roller-ways 58, 59 are also slidably supported upon a plurality of rollers 64 rotatably mounted in horizontal members 65, 66 of the side frame generally 15 in the same manner described with respect to the roller-ways 41, 42.

Each of the movable restrainer means generally 32 is thus supported to be reciprocably movable, horizontally, toward the stationary restraining means generally 25 at the opposite side of the runway generally 17. The first cushion 35 is operated by a first actuating means generally 69 which is comprised of a pneumatic cylinder 70 the rear end of which is attached to a clevis 71 fastened to a channel member 72 extending from the frame generally 10. The forward end of the pneumatic cylinder 70 is directed toward the plate 36 and is connected to the middle brace member 39 thereon by its piston rod 73.

Similarly, the second cushion 52 is movable by a second actuating means generally 75 comprising a pneumatic cylinder 76 attached to a clevis 77 on a channel member 78 extending from the frame generally 10. Similarly, the middle brace member 56 on plate 53 is connected to a piston rod 79 extending from the pneumatic cylinder 76.

At each side of the animal runway generally 17 extending the length of the restrainer means generally 25 and 32, and extending vertically between the latter means and the level of the conveyor 18, are a pair of sheet metal guard members generally 81, 82. These guards are desirable as a protection against the animal's legs slipping past the edge of the conveyor 18, particularly when the animal is unconscious and resting thereon.

Additionally, a longitudinal overhead rod 84 may be suspended above the center of runway 17, in a vertically adjustable manner, from the overhead members 13 so as to prevent animals from jumping out of the restraining apparatus.

As shown in FIGURES 2 and 3, at the forward or discharge end of the apparatus to which the unconscious animals are conveyed on conveyor 18 a downwardly inclined ramp generally 86, comprising a frame 87 and a plurality of rollers 88 journaled therein, is provided so that the animals will leave the end of conveyor 18 and move from the apparatus by their own weight.

In FIGURES 4 and 5, the preferred system for operating and controlling the restraining apparatus when used in conjunction with an electrical stunning instrument generally 90, such as one having spring-loaded probes 91 which are designed to be pressed against the head of an animal and deliver an electric shock thereto, is shown. The details of such a stunning apparatus and a similar electrical control system for controlling the duration of electric shock and operating a restrainer apparatus is described in detail in my co-pending joint application S.N. 833,288, filed August 12, 1959, now Patent No. 3,055,046.

The spring-loaded probes 91 of the stunning instrument generally 90 are designed to close an internal switch 92 when sufficient pressure is applied to an animal's head to insure good electrical contact. As will become apparent upon studying the wiring diagram of FIGURE 5, the closing of the switch 92 will both deliver electric current to the spring-loaded probes 91 and initiate actuation of the conveyor 18.

The stunning instrument 90 also carries two hand-operated switches 93 and 94 in its handle. Switch 93 is connected to cause the first and second actuating means generally 69 and 75 to move the restraining means generally 32 to engage an animal. Normally the restraining means 32 remains in the engaging position for an established period of time after which they will automatically open. That period of time generally corresponds to the period necessary to render the animal sufficiently unconscious such as the period that an electrical current is supplied to the probes 91. However, in case of malfunction or other unpredictable circumstances the switch 94 may be operated to override the control circuit and cause the restraining means to be opened.

The electrical control system generally, as seen in FIGURE 5, comprises a transformer 97 for stepping up voltage supplied to the probes 91, and a timer 98 operating through a holding relay 100. A timer actuator relay 101 controls the period during which current is supplied to the primary winding of the transformer 97, and thus the period of time during which a shock is applied to an animal. A second timer 99 limits the period of time that the restraining apparatus will remain closed upon an animal after the stunning operation is commenced, as will be subsequently explained. The second timer 99 permits the latter period to be varied somewhat independently of the operation of the stunning instrument.

I have added to this control system a conveyor motor control generally 103, comprising an additional timer 104 and a holding relay 105 to regulate the interval during which current is supplied to a motor 106 of the conveyor drive apparatus generally 22 (as identified in FIGURE 2). This interval normally commences when energy is supplied to the spring-loaded probes 91. As may be seen in FIGURES 4 and 5, closing of the switch 93 will energize a restrainer actuating solenoid 108 which is connected to move an air vale 109 to deliver air under pressure from a source, not shown, to a manifold 110 connected to the rear of both actuating means 69 and 75. This will advance pistons within the pneumatic cylinders 70 and 76 to extend the piston rods 73, 79 and close the restraining apparatus. At the same time the coil of holding relay 100 is energized to connect the coil of a timer actuator relay 101 in series with the probe actuated switch 92. Upon closing the latter switch, by pressing the stunning instrument 90 against an animal, the time actuator relay 101 is energized to close a switch connecting current to the transformer 97, and thus to the probes 91; and concurrently start the timing period of the stunning charge timer 98 and restrainer timer 99. Closing of the switch 92 will also energize and close the holding relay 105 of the conveyor motor control generally 103, and at the same time current is delivered to conveyor motor 106. Actuation of the latter relay starts the timing period of motor control timer 104.

When the restrainer timer 99 automatically breaks the electrical connection to thee solenoid 108 the air valve 109 will move to connect a manifold 111 to the source of air under pressure and connect manifold 110 to an exhaust line. This delivers air under pressure to the forward side of pneumatic cylinders 70 and 76 to open the restraining means. Subsequently, the motor control timer 104 disconnects power to the motor 106 after a period sufficient for the animal to be moved from the end of conveyor 18, and the cycle may then be repeated on the next animal.

A second embodiment of my invention is shown in FIGURE 6 wherein the parts of the apparatus corresponding to those elements already described are designated by the same reference characters bearing prime exponents. In that embodiment the restrainer means 25' is slidably mounted in a pair of vertical tracks 114, 115 fastened to opposite upright members 11' of the frame generally 10'. An additional pneumatic cylinder 116 is secured in a vertical position to the frame generally 10' and has a connecting rod 117 attached to an assembly on the back side of plate 27'. Separate pipe lines, not shown, connect the pneumatic cylinder 116 to a source of air under pressure so that the plate 27' and its cushion (not seen in FIGURE 6) may be adjustably raised and lowered to any desired position. A pair of locking mechanisms generally 118 serves to secure the restrainer means 25' at the selected elevation. The restrainer means 25', however, is not movable horizontally. This structure has the further advantage of being vertically adjustable to accommodate a wider range of animal sizes which may vary considerably between the sheep and calves.

Obviously many modifications and variations of the invention as hereinbefore set forth may be made without departing from the spirit and scope thereof, and therefore only such limitations should be imposed as are indicated in the appended claims.

I claim:

1. An improved apparatus for restraining animals, said apparatus comprising: an endless conveyor trained along a given path; a stationary restraining means mounted at one side of path; a pair of moveable restraining means mounted at the other side of said path opposite said stationary restraining means; slide means independently supporting said pair of moveable restraining means for reciprocal movement toward said stationary restraining means; and actuating means connected to each of said moveable restraining means for independently reciprocating said means in unison.

2. An improved apparatus for restraining sheep and calves, said apparatus comprising: a frame; an endless conveyor trained across the bottom of said frame; stationary guards positioned within said frame above the edges of said conveyor; a stationary cushion mounted within said frame spaced above one side of said conveyor; a pair of horizontally movable cushions mounted within said frame above the opposite side of said conveyor, said pair of cushions being positioned side by side in line with said conveyor; slide means independently supporting said pair of cushions for reciprocal movement toward said stationary cushions; and actuating means connected to each of said moveable cushions for independently reciprocating said cushions in unison.

3. An improved apparatus for restraining sheep and calves said apparatus comprising: a frame; an endless conveyor trained across the bottom of said frame; stationary guards positioned within said frame above the edges of said conveyor; a stationary cushion mounted within said frame spaced above one side of said conveyor, said stationary cushion being adjustably mounted so as to be positionable vertically at selected distances above said conveyor; means to raise and lower said stationary cushion within said frame with respect to said conveyor; a pair of horizontaily moveable cushions mounted within said frame above the opposite side of said conveyor, said pair of cushions being positioned side by side in line with said conveyor; slide means independently supporting said pair of cushions for reciprocal movement toward said stationary cushion; and actuating means connected to each of said moveable cushions for independently reciprocating said cushions in unison.

References Cited by the Examiner
UNITED STATES PATENTS

| | | | |
|---|---|---|---|
| 1,599,134 | 9/1926 | King | 17—1 |
| 2,912,715 | 11/1959 | Moss | 17—1 |
| 3,051,984 | 9/1962 | Hlavacek et al. | 17—1 |
| 3,101,508 | 8/1963 | Murphy et al. | 17—45 |

SAMUEL KOREN, *Primary Examiner.*

LUCIE H. LAVDENSLAGER, *Examiner.*